US012152411B2

(12) United States Patent
Spånberg et al.

(10) Patent No.: US 12,152,411 B2
(45) Date of Patent: Nov. 26, 2024

(54) LOCK SENSOR ASSEMBLY

(71) Applicant: Assa Abloy Limited, Willenhall (GB)

(72) Inventors: Mark Spånberg, Willenhall (GB); Reuben Proud, Willenhall (GB); Mats Rundberg, Willenhall (GB); Sten Rundberg, Willenhall (GB)

(73) Assignee: Assa Abloy Limited, Willenhall (GB)

( * ) Notice: Subject to any disclaimer, the term of this patent is extended or adjusted under 35 U.S.C. 154(b) by 227 days.

(21) Appl. No.: 17/723,157

(22) Filed: Apr. 18, 2022

(65) Prior Publication Data

US 2022/0333408 A1 Oct. 20, 2022

(30) Foreign Application Priority Data

Apr. 20, 2021 (GB) .................................... 2105624

(51) Int. Cl.

| | |
|---|---|
| ***E05B 63/00*** | (2006.01) |
| ***E05B 45/06*** | (2006.01) |
| ***E05B 47/00*** | (2006.01) |
| ***G08B 13/08*** | (2006.01) |
| ***G08B 25/00*** | (2006.01) |

(52) U.S. Cl.

CPC .......... *E05B 63/0052* (2013.01); *E05B 45/06* (2013.01); *E05B 2047/0094* (2013.01); *E05Y 2201/22* (2013.01); *E05Y 2900/132* (2013.01); *G08B 13/08* (2013.01); *G08B 25/008* (2013.01)

(58) Field of Classification Search

CPC ................. E05B 63/0052; E05B 45/06; E05B 2047/0094; E05B 2047/0068; E05B 2047/0069; E05B 15/021; E05B 41/00; E05B 2045/0665; E05Y 2201/22; E05Y 2900/132; G08B 13/08; G08B 25/008; E05C 9/185; E05C 9/02; E05C 17/48; E05C 9/1808

See application file for complete search history.

(56) References Cited

U.S. PATENT DOCUMENTS

2015/0348385 A1* 12/2015 Lamb .................... G08B 29/20 340/547
2022/0341229 A1* 10/2022 Derham ................. E05B 45/06

FOREIGN PATENT DOCUMENTS

| | | |
|---|---|---|
| CN | 204081707 U | 1/2015 |
| CN | 107016812 A | 8/2017 |
| DE | 3535301 A1 | 4/1986 |

(Continued)

OTHER PUBLICATIONS

Search Report dated Sep. 20, 2022 for European Application No. 22168905.2-1005, 12 pgs.

(Continued)

*Primary Examiner* — Joseph H Feild
*Assistant Examiner* — Rufus C Point
(74) *Attorney, Agent, or Firm* — Spencer Fane, LLP

(57) ABSTRACT

A covering (200) for an opening in a building and a sensor assembly (500) is disclosed. The covering (200) comprises a panel (201) moveable between an open position and a closed position, and to an intermediate position between the open position and the closed position. The sensor assembly (500) is configured to sense the position of a locking member (205) of the covering and to transmit signals indicating the position of locking member (205). Methods of installing a sensor assembly (500) on a covering (200) of an opening of a building are also disclosed.

16 Claims, 7 Drawing Sheets

(56) References Cited

FOREIGN PATENT DOCUMENTS

| | | | | |
|---|---|---|---|---|
| DE | 4232809 | A1 | 5/1993 | |
| DE | 19500054 | C1 | 7/1996 | |
| DE | 10059582 | A1 | 6/2002 | |
| DE | 202018103872 | U1 | 9/2018 | |
| EP | 0397179 | A2 * | 11/1990 | .............. E05F 15/71 |
| EP | 0720136 | A2 | 7/1996 | |
| EP | 2110500 | A2 | 10/2009 | |
| EP | 2933418 | A1 | 10/2015 | |
| EP | 3239944 | A1 | 11/2017 | |
| EP | 3421703 | A1 | 1/2019 | |
| GB | 2554394 | A | 4/2018 | |
| GB | 2559563 | A | 8/2018 | |
| GB | 2582608 | A | 9/2020 | |
| GB | 2599903 | A | 4/2022 | |
| JP | 10289388 | A | 10/1998 | |
| JP | 2013044217 | A | 3/2013 | |
| KR | 101897504 | B1 | 9/1998 | |
| WO | 2015171385 | A | 11/2015 | |
| WO | 2015171387 | A1 | 11/2015 | |
| WO | WO-2016012520 | A1 * | 1/2016 | ........... E05B 15/021 |
| WO | 2018055398 | A1 | 3/2018 | |
| WO | 2019077366 | A1 | 4/2019 | |

OTHER PUBLICATIONS

Combined Search and Examination Report received in Application Serial No. GB2105624.7 on Oct. 14, 2021, 7 pgs.

Search Report dated Oct. 27, 2022 for Application No. GB2105624.7, 3 pgs.

* cited by examiner

LOCK SENSOR ASSEMBLY

REFERENCE TO RELATED APPLICATION

This application claims priority to U.K. Applic. No. 2105624.7, filed on Apr. 20, 2022, the contents of which are incorporated herein by reference.

FIELD OF THE INVENTION

The present invention concerns coverings for buildings, such as doors and windows. More particularly, but not exclusively, this invention concerns a sensor assembly configured to be able to sense the position of a locking member of a covering for a building. The invention also concerns methods for installing a sensor assembly on a covering for a building.

BACKGROUND OF THE INVENTION

Some door and window systems are lockable in multiple configurations. For example, as well as being able to be locked in a closed configuration, a window may be lockable in a vented configuration in which the window is partially open. An example of such a window system 100 is shown in FIG. 1 and FIG. 2.

The window system 100 comprises a window 101 hinge mounted to a window frame 102. The window 101 comprises a movably mounted elongate locking rod 103 which is coupled to a handle of the panel (not shown) at a first end and which comprises a locking member 105 which projects from the locking rod 103 at a second end. The window frame 102 comprises a keep 107 formed with a first channel 109 and a second channel 111 for receiving the locking member 105. The window 101 is lockable in a fully closed position, shown in FIG. 1, by moving the window 101 to a closed position and then moving the handle of the window 101 to a locked position to move the locking member 105 into the first channel 109 of the keep 107. The window 101 is also lockable in a vented position, shown in FIG. 2, in which the window is partially open by moving the window 101 so that the locking member 105 is aligned with the second channel 109 of the keep 107 and then moving the handle of the window 101 to a locked position to move the locking member 105 into the second channel 109. Such window systems are well known. Door systems having similar functionality also exist.

There is a desire to provide such window and door systems with a lock sensing arrangement that is able to determine the locked state of the window or door and to provide an end user with information regarding the locked state of the window or door. While the user may simply want to know if the window or door is locked or unlocked, they may also want to know in what position the panel of the window or door is locked. For example, in adverse weather conditions a user may wish to avoid leaving a window or door locked in a vented position and may therefore wish to be informed that the window or door is locked in such a position.

Some prior art systems which are able to provide a remote user with information regarding the locked status of a door or window, such as those disclosed in GB2563060A and in WO2018/220384A1, provide that information based on the position of a locking member but do not take into account the position of the window or door. Such systems may not be suitable for door or window arrangements where a locking member might get moved to a locked position when the door or window is not in a closed position because the window or door may be incorrectly determined to be locked when in fact it is not.

WO2019/077366A1 discloses a lock system that detects the locked status of a door from the magnetic field provided by a magnetic key.

Furthermore, in some cases there may be a desire to a lock sensing functionality to a door or window that may have been provided to an end user without such functionality. Some prior art doors and windows have sensing arrangements that are integrated in a way that would be complex to retrofit on a door or window.

The present invention seeks to mitigate the above-mentioned problems.

SUMMARY OF THE INVENTION

The present invention provides, according to a first aspect, a covering for an opening in a building and a sensor assembly, wherein the covering comprises a panel, a frame member, and wherein the sensor assembly comprises a sensor, wherein one of the panel or frame member comprises a locking member and the sensor is positioned on the other one of the panel or frame member, wherein the panel is moveable relative to the frame member between an open position and a closed position and wherein the locking member is moveable to a first locked position when the panel is in the closed position to lock the panel in the closed position, and wherein the sensor is configured to sense the position of the locking member and, when the position of the locking member is sensed to be in the first locked position, the sensor assembly is configured to transmit a first signal indicating that the locking member is sensed to be in the first locked position.

By sensing that the locking member is in the first locked position, the sensor assembly is effectively able to determine if the panel is locked in the closed position, and to transmit a signal indicating the locked status of the panel to an end user, for example. The sensor assembly may determine that the panel is in an unlocked configuration if the locking member is not sensed to be in the first locked position. An unlocked configuration should be understood to correspond to a configuration in which the panel is able to be freely opened and closed by someone trying to gain access to the building. The panel may be a door leaf and the frame member may form a jamb or other part of a door frame. The panel may be a window and the frame member may form part of a window frame. In some embodiments, the frame member may form part of the structure of the building itself. The signal may be a wireless signal. For example, the signal may be an RF, Bluetooth®, or WIFI signal. Alternatively, the signal may be sent via a wired connection of the sensor assembly.

It should be understood that the locking member is the member of the panel or frame member which engages with the other one of the panel or frame member to lock to panel in position with respect to the frame member. The sensor assembly may be configured to sense the position of the locking member itself. For example, the locking member may be a bolt or paddle that is moveable into and out of a keep. The locking member may alternatively be a cam. The sensor assembly may be configured to sense the position of the bolt, paddle, or cam within the keep. Alternatively, there may be another member coupled to the movement of locking member, and the sensor assembly may be configured to sense the position of the other member in order to determine the position of the locking member. For example, there may be a pin attached to a locking rod that moves a bolt into and out of the keep, and the sensor assembly may be configured to sense the position of the pin in order to determine the position of the bolt. Alternatively, the sensor assembly may be configured to sense the position of a handle or other member for actuating the locking member.

The invention thereby provides an arrangement in which the locked status of a covering for a building, such as a door or window, is determined from the both the position of the locking member and the panel. This is advantageous over systems which sense only the position of the panel because if the panel is closed but not locked in the closed position, the system may incorrectly determine that the panel is locked in the closed position. Similarly, the invention is advantageous over systems which sense only the position of the locking member because if the locking member is in a locked position but the panel is not in a closed position, the system may incorrectly determine that the panel is locked in the closed position. The lock status is transmitted to provide information regarding the lock status to a third party. For example, the occupier of a house may wish to know if a window or door of the house is open or closed.

The panel may be moveable relative to the frame member to an intermediate position, between the open position and the closed position. The locking member may be moveable to a second locked position when the panel is in the intermediate position to lock the panel in the intermediate position. The sensor assembly may be configured to transmit a second signal indicating that the locking member is sensed to be in the second locked position when the position of the locking member is sensed to be in the second locked position.

The sensor assembly may therefore effectively be configured to determine that the panel is locked in the intermediate position by sensing that the locking member is in the second locked position. The intermediate position may correspond to a position in which a door or window is partially open, such a position may be referred to as a “vented position”. Therefore, the sensor assembly may be configured to not only transmit a signal indicating that the panel is locked, but also in which configuration it is locked. For example, if there is adverse weather, an occupier of a house may wish to know if a window has been locked in a vented position in which there may be water ingress through the window. The signal may be transmitted to an end user’s smart device, such as a smart phone, for example.

The locking member may be manually moveable into the first and/or second locked position. For example, the door or window arrangement may comprise a handle or other actuation member for manually moving the locking member into the first and/or second locked position. Alternatively, the covering may be provided with a resilient biasing member that moves the locking member into the first and/or second locked position. Where the covering comprises a resilient biasing member, a handle or other actuation member may be provided for moving the locking member out of the first and/or second locked position.

The sensor assembly may be configured to determine that the panel is in an unlocked configuration if the sensed position of the locking member does not correspond to the first locked configuration or the second locked configuration. The sensor assembly may be configured to transmit a wireless signal indicating that the panel is unlocked if the sensed position of the locking member does not correspond to the first locked configuration or the second locked configuration.

The sensor assembly may comprise two sensors. Each sensor may be positioned on the other one of the panel or frame member. Both sensors may be configured to sense the proximity of the locking member to the sensor and to provide a signal indicative of the proximity of the locking member to the sensor. The sensor assembly may be configured to determine whether the panel is locked in the closed position or locked in the intermediate position by comparing the signals provided by each of the two sensors to reference values.

There may be a first set of reference values which correspond to the expected sensor readings when the locking member is in the first locked position. There may be a second set of reference values which correspond to the expected sensor readings when the locking member is in the second locked position. The reference values may be stored on a memory of the sensor assembly. The reference values may have been obtained during a calibration process performed when the sensor assembly was fitted to the covering. Alternatively, the reference values may be generic and stored in a memory of the sensor assembly during the manufacturing process.

The two sensors may be arranged along an axis such that, when the panel is moved between the open and closed position, the locking member and sensors move relative to one another along the axis. The sensors may, for example, be aligned with the channels of a keep of the other one of the panel or frame member. The covering may have a width dimension and a height dimension in a plane defined by an opening in a building. The covering may have a thickness dimension in a direction perpendicular to the width and height dimension. The axis may be parallel to the width direction. For example, the two sensors may be arranged along a direction defined by the thickness of the panel or frame member.

The sensor(s) may be inductive sensors. Where inductive sensors are used, and the locking member is metallic, each sensor may be configured to sense the proximity of the metallic locking member. Alternatively, if the locking member is non-metallic, or if the sensor(s) are positioned away from the locking member, a metallic member, such as a pin, may be coupled to the movement of the locking member and each sensor may be configured to sense the proximity of the metallic member.

The sensor assembly may comprise a sensor module. The sensor module may house the sensor(s) and a transmitter configured to transmit the signals(s). The sensor module may be mounted to the other one of the panel or a frame member of the covering. The sensor module provides the sensor(s) and a transmitter in a convenient package for mounting to a door panel, window, or frame. The transmitter by be configured to transmit a wired and/or wireless signal. Such an arrangement may be easily mounted to the covering to provide the covering with a lock sensing arrangement. The sensor module may also contain batteries configured to power the sensor module. Alternatively, the sensor module may be configured to receive power from an external power supply. The sensor module may have a length, a width, and a thickness. The length, width, and thickness dimensions may be no greater than 150 millimetres×50 millimetres×10 millimetres. The sensor module may comprise two sensors. The two sensors may be positioned adjacent one another across the width of the sensor assembly. The sensor module may be configured to be positioned such that its width direction aligns with the thickness direction of the covering.

The wireless transmitter may be configured to emit a Bluetooth signal. Alternatively, the wireless transmitter may be wirelessly connected to the internet and configured to transmit the signal(s) to an end user via the internet. The skilled person will be aware of a variety of suitable wireless transmitters suitable to wirelessly transmit information regarding the locked status of the covering, and it should be understood that the invention is not limited to use of a specific type.

The sensor module may be attached to the panel or frame via a mount. The sensor module may comprise formations configured to interlock with the mount to hold the module in place upon the panel or frame. The mount may be fixed to the frame or panel with fasteners, such as screws. Alternatively, the mount may be adhesively bonded to the frame or panel. In some embodiments, the module itself may be directly screw fixed or adhesively bonded to the frame or panel.

The sensor assembly may comprise a hub configured to be positioned remotely of the sensor(s). The sensor assembly may be configured to transmit signals to the hub indicating the sensed position of the locking member. The hub may be configured to transmit the first signal and, optionally, second signal.

The sensors may be in wired or wireless connection with the hub. The hub may be configured to be connected with a plurality of other sensor arrangements configured to sense the locked status of a plurality of coverings. There may be a plurality of sensor assemblies mounted to a respective plurality of coverings of a building. For example, a building may have multiple doors and windows each comprising a sensor assembly, and each sensor assembly may be in wireless or wired connection with a central hub. The hub may be configured to receive the wireless signals from the sensors and to send information regarding the locked status of the doors and windows to an end user. The information may be sent to a third party electronic device (for example, a smartphone, tablet, or other "smart" device) via the internet.

According to a second aspect of the invention, there is provided a sensor module suitable for use in the sensor assembly of any the first aspect of the invention. As such, the sensor module may comprise any of the features described with respect to the sensor module of the first aspect of the invention. The sensor module comprises a housing, and the housing contains a sensor configured to sense the position of the locking member and a transmitter configured to transmit a signal indicating that the locking member is sensed to be in the first locked position when the position of the locking member is sensed to be in the first locked position.

The sensor module may comprise batteries to power the sensor module. Alternatively, the sensor module may be configured to receive an external power supply. The sensor module may comprise a memory. The memory may comprise a first stored set of reference sensor values which corresponds to the expected sensor readings when the locking member is in the first locked position. The memory may comprise a second stored set of reference sensor values which correspond to the expected sensor readings when the locking member is in the second locked position.

According to a third aspect of the invention, there is provided a method of installing a sensor assembly on a covering of an opening of a building. The method comprises the steps of fastening a first sensor to one of the panel or a frame of the covering, moving the panel to a closed position, moving a locking member of the other one of the panel or a frame to a first locked position to lock the panel in the closed position, sensing, using the sensor, the position of locking member when the locking member is in the first locked position, storing the sensor reading as a first calibration reading in a memory of the sensor assembly.

Following the step of storing the first calibration reading, the method may comprise the additional steps of sensing the position of locking member to obtain a sensor reading, comparing the sensor reading against the first calibration reading, and if the sensor reading is equal to the calibration reading then using a transmitter of the sensor assembly to transmit a signal indicating that the locking member is sensed to be in the first locked position.

The sensor reading may be determined to be equal to the calibration reading if the sensor reading is within a prescribed tolerance of the calibration reading. For example, the sensor reading may be determined to be equal to the calibration reading if the sensor reading is within 10% of the calibration reading.

The method may also comprise the steps of fastening a second sensor to the one of the panel or frame, moving the panel to an intermediate position, between an open position of the panel and the closed position of the panel, moving the locking member of the covering to the second locked position to lock the panel in the intermediate position, sensing, using the first sensor and the second sensor, the position of locking member when the locking member is in the second locked position, storing the first and second sensor reading as a second calibration reading in a memory of the sensor assembly.

Where the sensor assembly comprises two sensors, the step of sensing the position of locking member when the locking member is in the first locked position, may comprise sensing using both the first and second sensor readings, and the first and second sensor readings may be stored in the memory of the sensor assembly.

Following the step of storing the second calibration reading, the method may comprise the additional steps of sensing the position of locking member using the first and second sensors, comparing the first and second sensor readings against the second calibration reading, and if the first and second sensor reading is equal to the second calibration reading then using a transmitter of the sensor assembly to transmit a signal indicating that the locking member is sensed to be in the second locked position.

If the first and second sensor reading are not equal to the first calibration reading or the second calibration reading, the method may comprise the steps of using a transmitter of the sensor assembly to transmit a signal indicating that the locking member is sensed to be in an unlocked position.

It will of course be appreciated that features described in relation to one aspect of the present invention may be incorporated into other aspects of the present invention. For example, the method of the invention may incorporate any of the features described with reference to the covering for the opening in a building and sensor assembly of the first aspect of the invention and vice versa.

DESCRIPTION OF THE DRAWINGS

Embodiments of the present invention will now be described by way of example only with reference to the accompanying schematic drawings of which.

DETAILED DESCRIPTION

Figure 3:
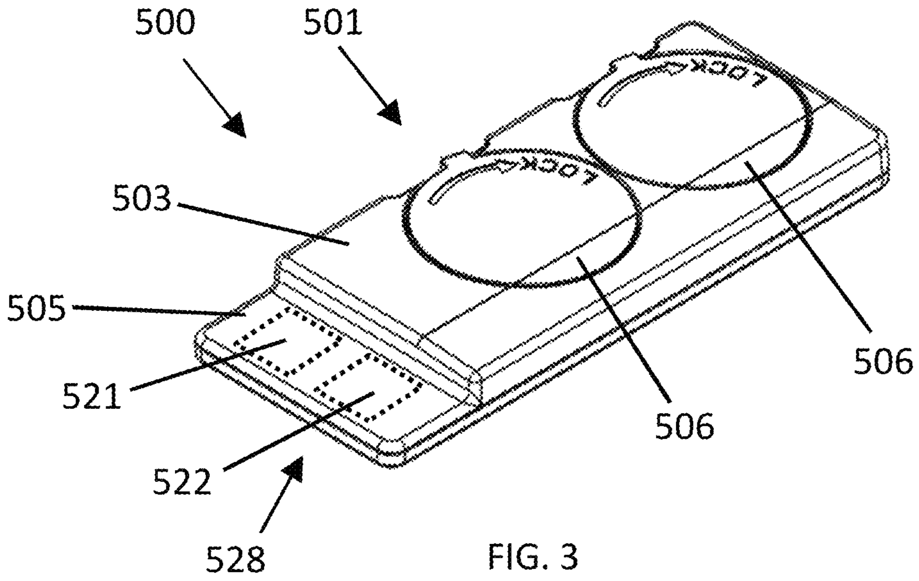
FIG. 3 shows a sensor module according to an embodiment of the invention which is configured to be able to sense the locked status of a door or window.
Figure 4:
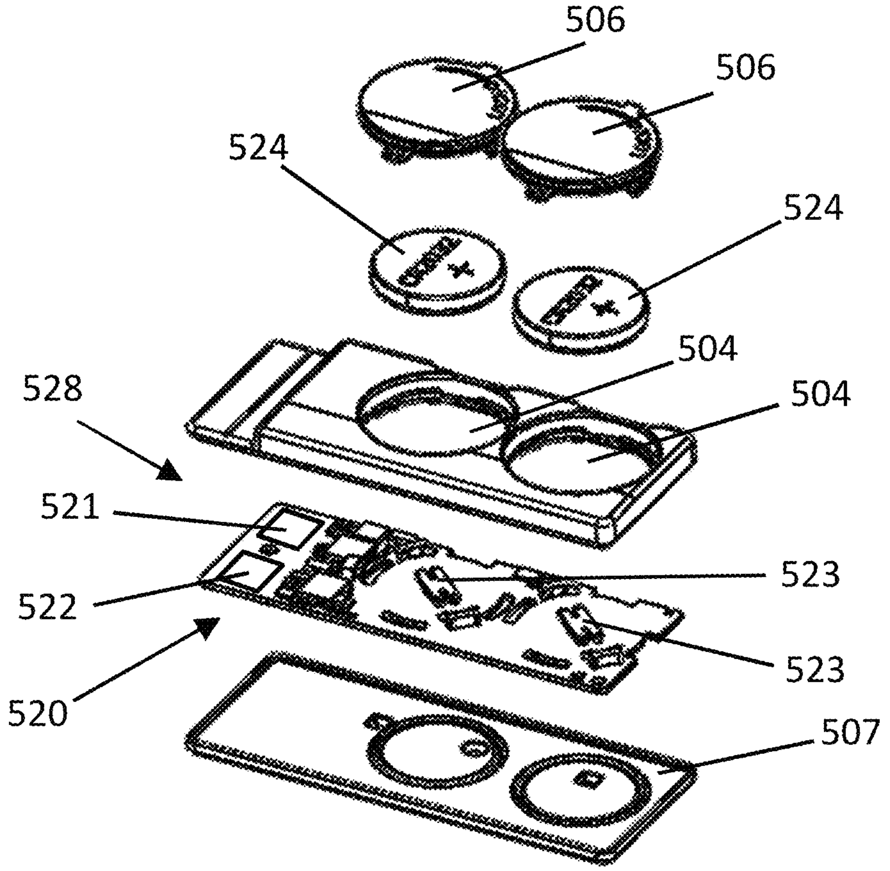
FIG. 4 is an exploded view of the sensor module of FIG. 3.
Figure 5:
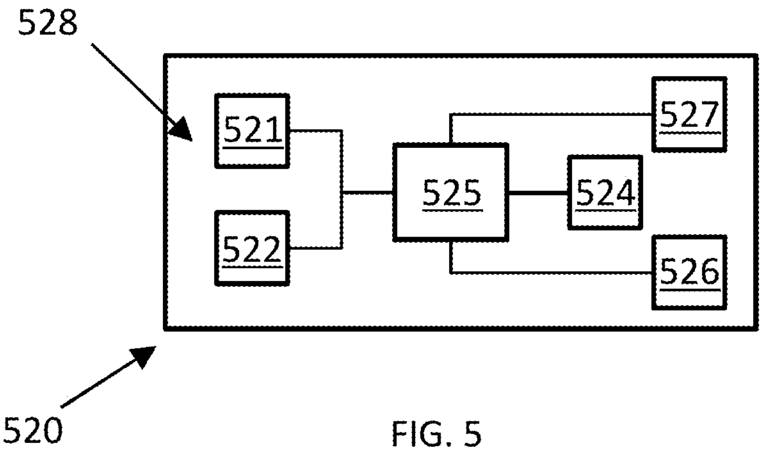
FIG. 5 is a schematic diagram illustrating the components of the sensor module.

According to an embodiment of the invention, a window or door can be fitted with the sensor module 500 that is shown in FIG. 3 in order provide a sensing functionality that is able to determine the locked status of the door or window. The sensor module 500 comprises a rectangular circuit board 520 which can be seen in the exploded view of the sensor module 500 that is shown in FIG. 4. At one end, the circuit board comprises a sensor array 528, which is made up of a first inductive sensor 521 and a second inductive sensor 522 positioned adjacent one another across the width of the circuit board 520. The circuit board also comprises battery ports 523 for batteries 524 to power the circuit board 520. The other components of the circuit board 520 are shown schematically in FIG. 5. The sensors 521, 522 and batteries 524 are connected to a processor 525, and the circuit board also comprises a wireless transmitter 526 and memory 527 which are also connected to the processor 525.

Figure 6:
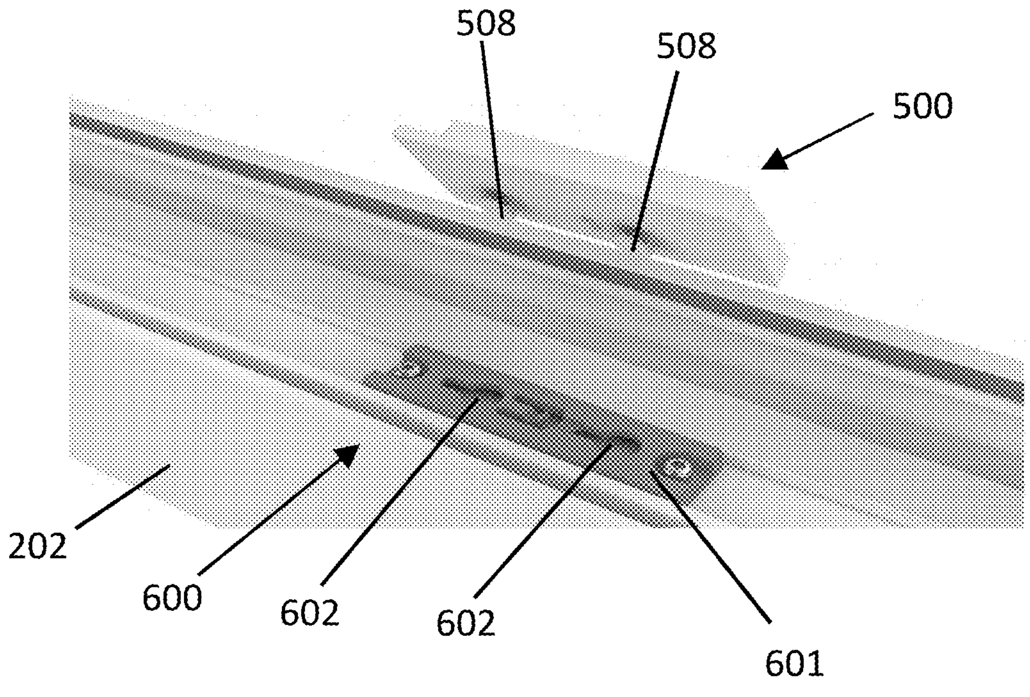
FIG. 6 shows how the sensor module is mounted to a window frame using a mount that is screw-fixed to the window frame.

The circuit board 520 is contained within a housing 501 having a main body 503 in the form of an elongate box which is dimensioned to contain the part of the circuit board 520 which holds the batteries 524, and which is formed with apertures 504 via which the batteries 524 can be inserted or removed. The apertures 504 are covered by lids 506. The housing 501 also comprises a lip section 505 that extends from an end of the main body 503 and which is dimensioned to contain the part of the circuit board which has the sensor array 528. The housing 501 is sealed by a base 507. The base 507 is formed with two mushroom shaped mounting members 508 which project from the surface of the base as shown in FIG. 6.

Figure 1:
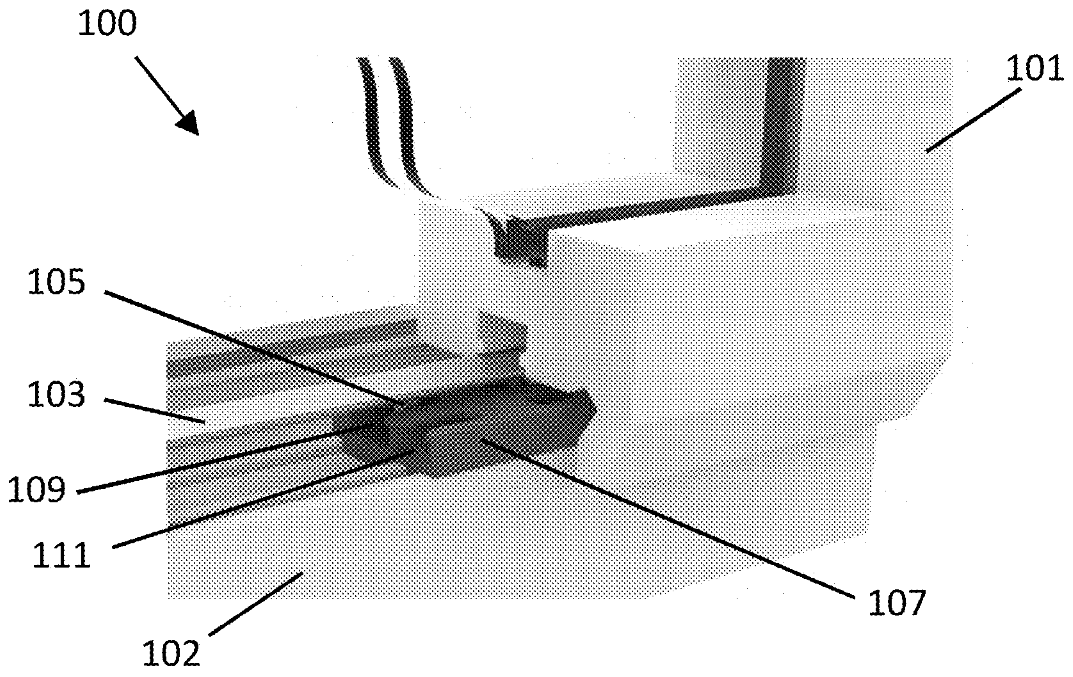
FIG. 1 shows a cut-away view of a known window system with the window in a closed and locked configuration.
Figure 2:
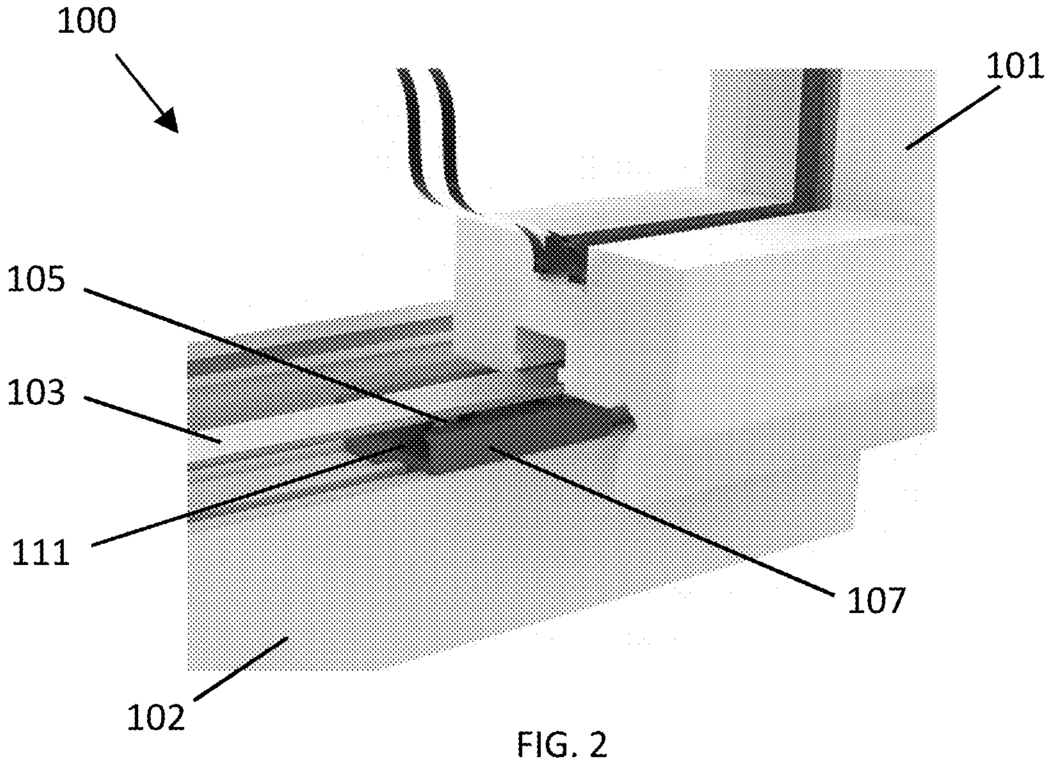
FIG. 2 shows the window system of FIG. 1 with the window in a vented and locked configuration.
Figure 7:
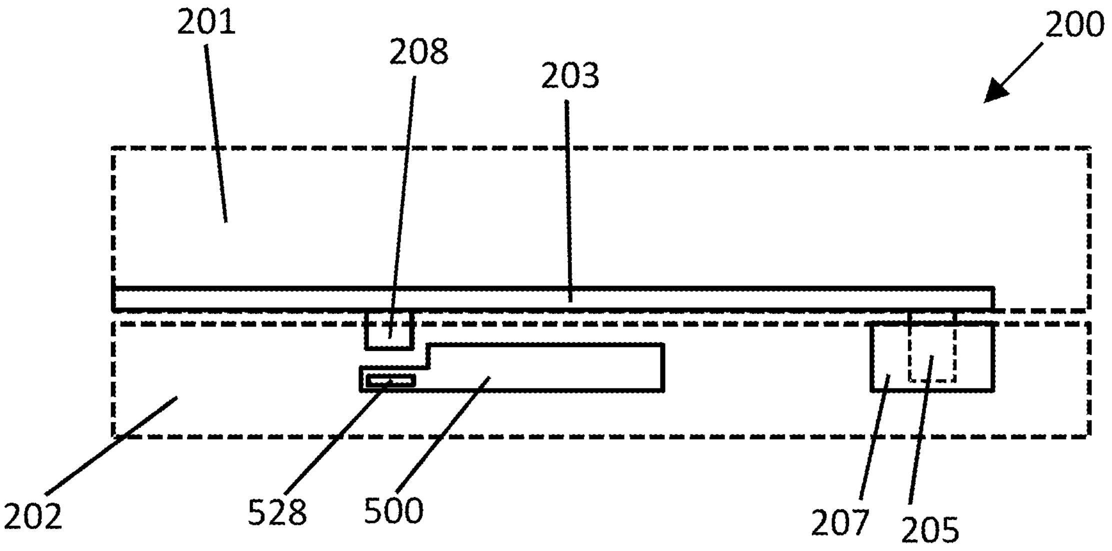
FIG. 7 is a schematic diagram of a known window system which has been fitted with a sensor module according to an embodiment of the invention, the window system is shown with the locking member in a locked position.
Figure 9:
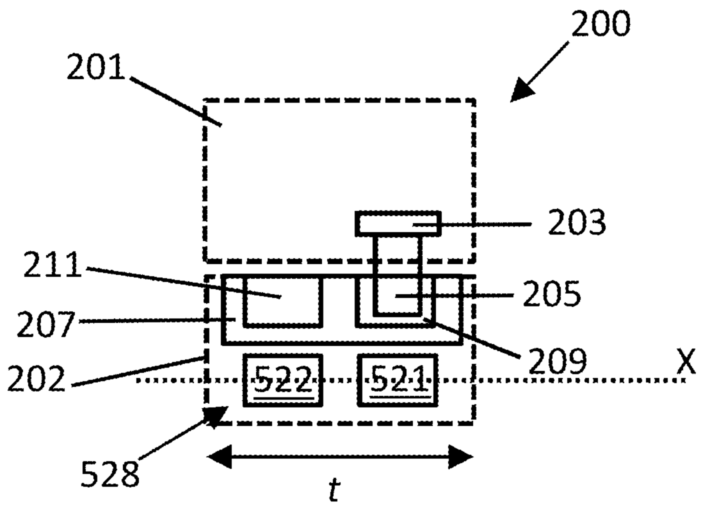
FIG. 9 is a schematic cross-sectional diagram of the window system of FIG. 7 in a closed and locked configuration.

The sensor module 500 can be fitted to a window system as shown in FIG. 1 and FIG. 2 via a mount 600. A mount 600 is shown as screw-fixed to a window frame 202 in FIG. 6. The mount 600 comprises a rectangular plate 601 formed with apertures 602 configured to interlock with the mushroom shaped mounting members 508 of the sensor module 500. In this case, the module 500 is mounted to the window frame 202 such that is positioned as schematically shown in FIG. 7 and FIG. 9. That is, such that the first sensor 521 is substantially aligned with the first channel 209 and such that the second sensor 522 is substantially aligned with the second channel 211, the first sensor 521 and second sensor 522 thereby being arranged along an axis X such that, when the panel is moved between the open and closed position, the locking member moves along the axis X relative to the first sensor 521 and the second sensor 522. The axis X is substantially parallel to a thickness direction t of the window frame 202.

Figure 8:
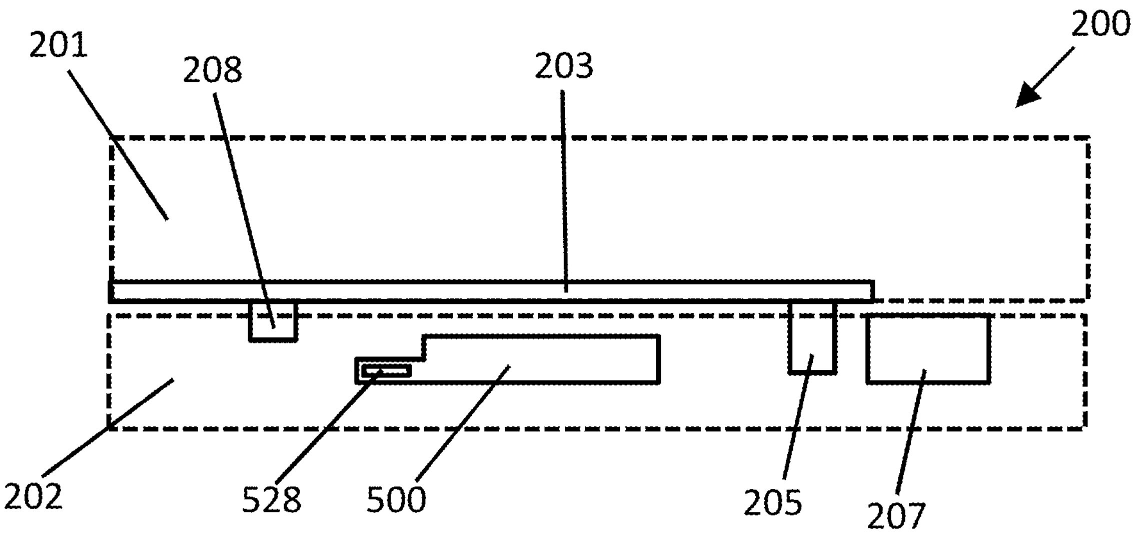
FIG. 8 corresponds to the diagram of FIG. 7 but with the locking member in an unlocked position.

FIG. 7 shows a portion of a window system 200 which is substantially identical to the window system 100 shown in FIG. 1 and FIG. 2. The sensor module 500 is mounted to the window frame 202 such that when the window 201 is in a close or vented position, the sensor module is located directly adjacent the locking rod 203. The locking rod 203 has been fitted with a steel pin 208 at a position on the locking rod 203 such that when the locking member 205 is located within the keep 207, the steel pin is directly adjacent the sensor array 528 of the sensor module 500. When the locking member 205 is moved out of the keep, the steel pin is moved away from the sensor array 528, as shown in FIG. 8.

Figure 10:
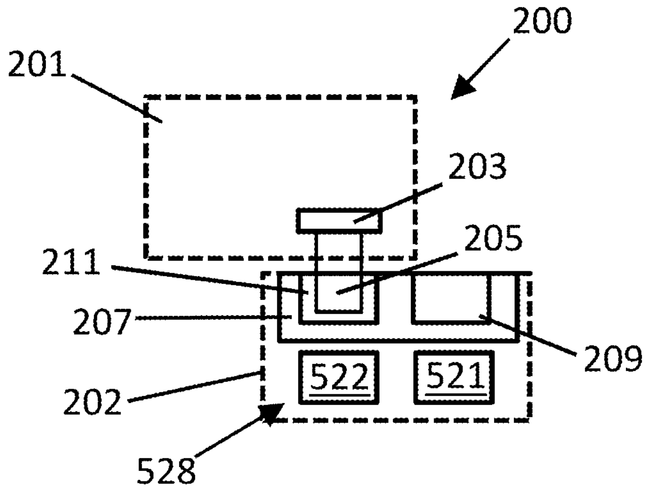
FIG. 10 corresponds to FIG. 9 but with the window system in a vented and locked configuration.

FIG. 9 shows a schematic cross-sectional view of the window system 200 with the window in a fully closed and locked configuration in which the locking member 205 is located within the first channel 209 of the keep 207. In this configuration the steel pin 208 which is attached to the locking member is located directly adjacent the first sensor 521. FIG. 10 shows a schematic cross-sectional view of the window system 200 with the window in a vented and locked configuration in which the locking member 205 is located within the second channel 211 of the keep 207. In this configuration the steel pin 208 which is attached to the locking member 203 is located directly adjacent the second sensor 522.

The sensors 521, 522 can sense the proximity of the steel pin 208 and each provide a sensor reading which is determined by the proximity of the steel pin 208 to the respective sensor 521, 522. The sensor module 500 is configured to be able to determine in which locked configuration the window system 200 is in by comparing the instantaneous sensor readings to a set of baseline sensor readings which are obtained during a calibration process which is performed when the sensor module 500 is installed in the window system 200.

Figure 11:
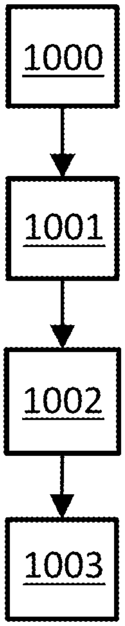
FIG. 11 is a diagram illustrating the process of calibrating the sensor.

The calibration process is shown schematically in FIG. 11. In step 1000, the window 201 is moved to the fully closed position and the window 200 is locked by moving the locking member 205 into the first channel 209. At this stage the window is in the configuration shown in FIG. 9. In step 1001 a set sensor readings corresponding to a "closed and locked state" are taken and stored in the memory 527 of the sensor module 500. In step 1002 the window 201 is moved to a vented position and the window 200 is locked by moving the locking member into the second channel 211. At this stage the window 200 is in the configuration shown in FIG. 10. In step 1003 a second set sensor readings corresponding to a "vented and locked state" are taken and stored in the memory 527 of the sensor module 500.

Figure 12:
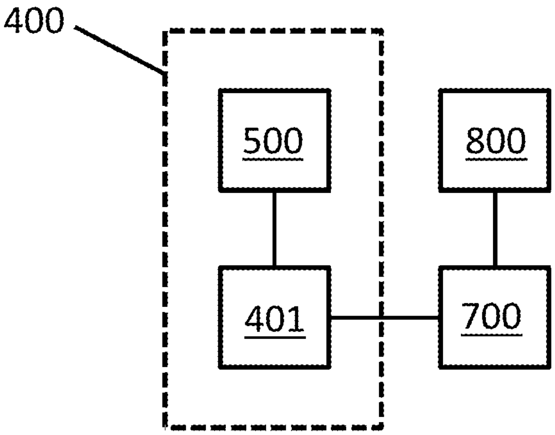
FIG. 12 is a schematic diagram of a lock sensing system.

The sensor module 500 forms part of a lock sensing system 400 which is shown schematically in FIG. 12. In this case, the lock sensing system 400 also comprises a central hub 401 to which the sensor module 500 is wirelessly connected. While this embodiment of the invention is being described with reference to a single sensor module 500, the central hub 401 is configured to be connectable to multiple sensor modules so that multiple windows and/or doors of a building can be provided with smart functionality. The central hub is wirelessly connected to the internet via a router 700 so that the central hub can communicate with an electronic device 800 (for example, a smart phone or tablet) of an end user. In other embodiments of the invention, there may not be a central hub, and the sensor module 500 may instead be connected to the internet.

Figure 13:
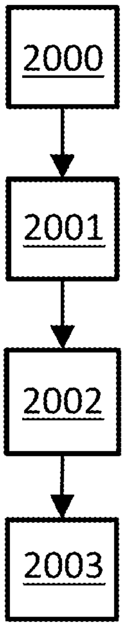
FIG. 13 is a diagram is illustrating the process of the lock sensing system providing an end user information regarding the locked status of a window.

The lock sensing system 400 is configured to provide the electronic device 800 of the end user with information about the locked status of the window system using a process that is shown schematically in FIG. 13. In step 2000 the sensors 521, 522 of the sensor module 500 each provide a sensor reading to the processor 525. In step 2001, the sensor reading is compared to the "vented and locked state" sensor reading and to the "closed and locked state" sensor reading, which were stored in the memory 527 of the sensor module 500 during the calibration process. If the sensor readings match the "closed and locked state" calibration readings, then the window 200 is determined to be in the closed and locked state. If the sensor readings match the "vented and locked state" calibration readings, then the window 200 is determined to be in the vented and locked state. If the sensor readings do not match either of the calibration readings, then the window is determined to be in an unlocked state. In step 2002, the wireless transmitter 526 transmits the locked state of the window 200 to the central hub 401, and in step 2003, the central hub 401 communicates the locked status of the window 200 to the electronic device 800 of the end user via the router 700 which is connected to the internet.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The lock sensing arrangement according the first embodiment of the invention has been described above in the context of a window system. However, it will be understood by the skilled person that the lock sensing arrangement could equally be provided on a door.

While lock sensing arrangement of the first embodiment of the invention comprises a module 500 configured to sense the position a steel pin 208 that is coupled to the locking rod. Other embodiments of the invention may be configured to sense the position of the locking member itself. For example, in some embodiments the sensors may be arranged to sense the position of the bolt itself. Furthermore, while the embodiment of the invention described above functions with a window system comprising a bolt that is transversely moveable into and out of a keep, it will be appreciated that the sensing arrangement can be applied to a variety of other locking arrangements. For example, sensing arrangement may be used in some window systems, or in door systems, where a bolt, paddle, or other locking member is configured to move into and out of a keep in a direction substantially perpendicular to the axis X labelled in FIG. 9.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A covering for an opening in a building and a sensor assembly, wherein:

the covering comprises a panel and a frame member;

the sensor assembly comprises a sensor module that houses a sensor;

one of the panel or frame member comprises a locking rod;

the sensor module and a keep are positioned on the other one of the panel or frame member, the sensor module being spaced apart from the keep along a length of the panel or frame member;

a locking member and a pin are mounted to the locking rod, the locking member and the pin being spaced apart along a length of the locking rod and coupled to movement of the locking rod;

the panel is moveable relative to the frame member between an open position and a closed position, and the panel is moveable to an intermediate position between the open position and the closed position;

the panel is configurable to a first locked configuration by moving the locking rod to move the locking member into the keep when the panel is in the closed position to lock the panel in the closed position, the panel is configurable to a second locked configuration by moving the locking rod to move the locking member into the keep when the panel is in the intermediate position to lock the panel in the intermediate position;

the sensor of the sensor module is configured to sense a position of the pin;

when the position of the pin is sensed to be in a position corresponding to the first locked configuration of the panel, the sensor assembly is configured to transmit a first signal indicating that the panel is in the first locked configuration; and when the position of the pin is sensed to be in a position corresponding to the second locked configuration of the panel, the sensor assembly is configured to transmit a second signal indicating that the panel is in the second locked configuration.

2. The covering for an opening in a building and a sensor assembly according to claim 1, wherein the sensor module houses two sensors, wherein both sensors are configured to sense the proximity of the pin to the sensor and to provide a signal indicative of the proximity of the pin to the sensor, and wherein the sensor assembly is configured to determine whether the panel is in the first locked configuration or in the second locked configuration by comparing the signals provided by each of the two sensors to reference values.

3. The covering for an opening in a building and a sensor assembly according to claim 2, wherein the two sensors are arranged along an axis such that, when the panel is moved between the open and closed position, the pin and sensors move relative to one another along the axis.

4. The covering for an opening in a building and a sensor assembly according to claim 1, wherein the sensor is an inductive sensor.

5. The covering for an opening in a building and a sensor assembly according to claim 1, wherein the sensor module houses a transmitter configured to transmit the signals.

6. The covering for an opening in a building and a sensor assembly according to claim 1, wherein the sensor assembly comprises a hub configured to be positioned remotely of the sensor, and wherein the sensor assembly is configured to transmit signals to the hub indicating the sensed position of the pin, and wherein the hub is configured to transmit the first signal and, optionally, second signal.

7. A sensor module suitable for use in the sensor assembly of claim 1, wherein the sensor module comprises a housing containing a sensor configured to sense a position of a pin and a transmitter configured to transmit a signal indicating that the panel is sensed to be in a first locked configuration when the position of the pin is sensed to be in a position corresponding to the first locked configuration; the housing comprises a main body and a lip section that extends from an end of the main body, the main body having a thickness which is greater than the lip section; the sensor is contained in the lip section; and a base of the module comprises formations configured to interlock with a mount to hold the module in place upon the panel or frame via the mount.

8. A sensor module according to claim 7, wherein the formations are mushroom shaped mounting members which project from the base.

9. A sensor module according to claim 7, wherein the main body is formed with an aperture into which a battery can be inserted.

10. A sensor module according to claim 9 wherein the aperture is covered by a lid.

11. A method of installing a sensor assembly on a covering of an opening of a building to form the covering for an opening in a building and sensor assembly of claim 1, the method comprising the steps of:

fastening a sensor module to one of a panel or a frame member of the covering, moving the panel to a closed position, moving a locking rod of the other one of the panel or frame member to move a locking member which is coupled to the locking rod into a first locked position, the first locked position corresponding to a position in which the locking member is situated within a keep to lock the panel in the closed position, sensing, using a first sensor of the sensor module, the position of a pin which is coupled to the locking rod when the locking member is in the first locked position, storing the sensor reading as a first calibration reading in a memory of the sensor assembly.

12. The method according to claim 11, wherein, following the step of storing the first calibration reading, the method comprises the additional steps of:

sensing the position of pin to obtain a sensor reading, comparing the sensor reading against the first calibration reading, and if the sensor reading is equal to the calibration reading then using a transmitter of the sensor assembly to transmit a signal indicating that the locking member is sensed to be in the first locked position.

13. The method according to claim 11, wherein the sensor module comprises a second sensor and the method comprises the step of:

moving the panel to an intermediate position, between an open position of the panel and the closed position of the panel, moving the locking rod to move the locking member to a second locked position, the second locked position corresponding to a position in which the locking member is situated within the keep to lock the panel in the intermediate position, sensing, using the first sensor and the second sensor, the position of the pin when the locking member is in the second locked position, storing the first and second sensor reading as a second calibration reading in a memory of the sensor assembly.

14. The method according to claim 13, wherein, following the step of storing the second calibration reading, the method comprises the additional steps of:

sensing the position of pin using the first and second sensors, comparing the first and second sensor readings against the second calibration reading, and if the first and second sensor readings are equal to the second calibration reading then using a transmitter of the sensor assembly to transmit a signal indicating that the locking member is sensed to be in the second locked position.

15. A method according to claim 14, wherein, if the first and second sensor readings are not equal to the first calibration reading or the second calibration reading, the method comprises the steps of:

using a transmitter of the sensor assembly to transmit a signal indicating that the locking member is sensed to be in an unlocked position.

16. A covering for an opening in a building and a sensor assembly according to claim 1, wherein the sensor module is attached to the panel or frame member via a mount that is fixed to the panel or the frame member, and the sensor module comprises formations which interlock with the mount to hold the module in place upon the mount.

* * * * *